United States Patent
Kudermann et al.

(10) Patent No.: US 11,519,513 B2
(45) Date of Patent: Dec. 6, 2022

(54) VALVE, HYDRAULIC SYSTEM AND MOTOR VEHICLE GEARBOX

(71) Applicant: ZF Friedrichshafen AG, Friedrichshafen (DE)

(72) Inventors: Karsten Kudermann, Constance (DE); Rainer Novak, Bregenz (AT); Markus Moosmann, Grünkraut (DE); Tobias Pfleger, Markdorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 50 days.

(21) Appl. No.: 16/761,611

(22) PCT Filed: Oct. 30, 2018

(86) PCT No.: PCT/EP2018/079661
§ 371 (c)(1),
(2) Date: May 5, 2020

(87) PCT Pub. No.: WO2019/086424
PCT Pub. Date: May 9, 2019

(65) Prior Publication Data
US 2020/0271231 A1    Aug. 27, 2020

(30) Foreign Application Priority Data
Nov. 6, 2017    (DE) ...................... 10 2017 219 645.9

(51) Int. Cl.
*F16K 11/07*    (2006.01)
*F15B 13/04*    (2006.01)
(Continued)

(52) U.S. Cl.
CPC .......... *F16K 11/07* (2013.01); *F15B 13/0402* (2013.01); *F16H 61/0251* (2013.01);
(Continued)

(58) Field of Classification Search
CPC .. F16K 11/07; F16K 11/0716; F15B 13/0402; F15B 2211/3127;
(Continued)

(56) References Cited

U.S. PATENT DOCUMENTS

| | | |
|---|---|---|
| 5,020,324 A | 6/1991 | MacDonald et al. |
| 5,074,335 A | 12/1991 | Beuermann |

(Continued)

FOREIGN PATENT DOCUMENTS

| | | |
|---|---|---|
| DE | 1273941 A | 7/1968 |
| DE | 3925771 A1 | 2/1991 |

(Continued)

OTHER PUBLICATIONS

International Search Report (English Translation) PCT/EP2018/079661, dated Feb. 22, 2019. (2 pages).
(Continued)

*Primary Examiner* — Patrick C Williams
(74) *Attorney, Agent, or Firm* — Dority & Manning, P.A.

(57) ABSTRACT

A valve (V, V1, V2) includes a housing (VG) and a piston (VK) displaceably guided therein. A first end (VK1) of the piston (VK) can be acted upon by a force, with the aid of which the piston (VK) is displaceable against a spring (F) acting upon a second end (VK2) of the piston (VK). The valve (V, V1, V2) has four switching conditions, in which four ports (A, B, P, T) in the housing (VG) are selectively connectable to one another or blocked with respect to one another. In a first switching condition, none of the ports (A, B, P, T) are connected to one another. The spring (F) is configured in such that, in the absence of an application of force onto the first end (VK1), the piston (VK) is held in a position, which corresponds to the first switching condition of the valve (V, V1, V2).

12 Claims, 8 Drawing Sheets

(51) Int. Cl.
  *F16H 61/02* (2006.01)
  *F16H 61/30* (2006.01)
  *F15B 20/00* (2006.01)
(52) U.S. Cl.
  CPC ............ *F16H 61/30* (2013.01); *F15B 20/008* (2013.01); *F15B 2211/3122* (2013.01); *F15B 2211/3127* (2013.01); *F15B 2211/322* (2013.01); *F15B 2211/8636* (2013.01); *F15B 2211/8752* (2013.01); *F16K 11/0716* (2013.01)
(58) Field of Classification Search
  CPC ........ F15B 2211/322; F15B 2211/8636; F15B 2211/8752; F15B 2211/3122; F15B 20/008; F16H 61/0251; F16H 61/30
  See application file for complete search history.

(56) References Cited

U.S. PATENT DOCUMENTS

| | | | |
|---|---|---|---|
| 5,144,983 A | 9/1992 | Schwelm | |
| 5,445,188 A | 8/1995 | Bourkel et al. | |
| 6,318,477 B1* | 11/2001 | Betti | A01B 63/32 |
| | | | 172/452 |
| 9,382,923 B2* | 7/2016 | Carlin | F15B 1/04 |
| 9,689,501 B2 | 6/2017 | Pilawski | |
| 9,797,419 B2* | 10/2017 | Rantanen | E02F 9/2217 |
| 2009/0125200 A1* | 5/2009 | Bai | F16D 48/066 |
| | | | 701/60 |
| 2011/0202232 A1* | 8/2011 | Busch | A01B 63/00 |
| | | | 701/36 |
| 2014/0182722 A1* | 7/2014 | Hattori | F16H 61/00 |
| | | | 137/625.69 |
| 2015/0321553 A1* | 11/2015 | Pritchard | F16D 25/123 |
| | | | 192/48.601 |
| 2017/0159678 A1* | 6/2017 | Peterson | E02F 9/2217 |

FOREIGN PATENT DOCUMENTS

| | | |
|---|---|---|
| DE | 102007033690 A1 | 1/2008 |
| DE | 102009004286 A1 | 7/2010 |
| DE | 102011080667 A1 | 2/2013 |

OTHER PUBLICATIONS

German Search Report DE102017219645.9, dated Sep. 28, 2018. (14 pages).

* cited by examiner

VALVE, HYDRAULIC SYSTEM AND MOTOR VEHICLE GEARBOX

CROSS-REFERENCE TO RELATED APPLICATIONS

The present application is related and has right of priority to German Patent Application No. 10 2017 219 645.9 filed on Nov. 6, 2017 and to PCT International Publication No. WO2019/086424, both of which are incorporated by reference in their entirety for all purposes.

FIELD OF THE INVENTION

The invention relates generally to a valve, in particular a 4/4 directional valve. The invention further relates generally to a hydraulic system including such a valve, and to a motor vehicle transmission including this type of hydraulic system. The valve is not limited to the application in a hydraulic system, but rather can also be utilized in a pneumatic system.

BACKGROUND

Patent application DE 10 2007 033 690 A1 describes a hydraulic system for the open-loop control of a dual clutch transmission. Four double pistons, which are controlled by an open-loop system via a shift valve and two shift control valves, are utilized for shifting the gears. The shift valve and the two shift control valves are designed as electromagnetically actuated 4/4 directional valves. In the de-energized condition of the shift valve and of the shift control valves, two of the four double pistons are hydraulically locked. The remaining two double pistons are switched to disengage or contribute no force, so that they are freely movable. In order to hydraulically shut off all double pistons, the shift valve must be supplied with energy.

Patent application DE 10 2011 080 667 A1 describes a 4/4 directional valve as a slide valve, which is provided for a hydraulic open-loop control in an automatic transmission. The slide valve is spring-loaded and includes an intake port, two working ports, and a drain port. The valve slide is displaceable against the spring force with the aid of an actuator. In the non-energized condition of the actuator, the two working ports are connected to the drain port; the intake port is hydraulically disconnected from the remaining ports. In order to hydraulically shut off the working ports, the actuator must be supplied with energy.

SUMMARY OF THE INVENTION

A hydraulic shut-off can establish a safe condition of an actuator. The application of energy in order to achieve such a condition reduces the energy efficiency of the hydraulic system for the open-loop control of the actuator, however. Example aspects of the invention therefore provide a valve, with the aid of which such a condition (a safe condition) is also possible without a power feed.

As the solution to the problem according to an example aspects, a spring-loaded valve having four switching conditions is provided. The valve can assume intermediate positions in addition to the four switching conditions. The valve includes a piston, which is displaceably guided in a housing. A first end of the piston can be acted upon by a force, which acts counter to a force applied onto a second end of the piston by the spring. Four ports are provided at the housing, which are selectively connectable to one another or blocked with respect to one another, depending on the position of the piston. In other words, the valve is a spring-loaded 4/4 directional valve, which is designed as a proportional valve.

According to example aspects of the invention, the spring is configured in such a way that, in the absence of an application of force onto the first end of the piston, the piston is held in a position in which none of the ports are connected to one another via the valve. In this context, "connected" is understood to be a fluidic connection. This position corresponds to a first of the four switching conditions of the valve. The first switching condition is therefore suitable for the hydraulic shut-off of an actuator connected to the valve. In order to maintain the first switching condition, a force is not required to be applied at the first end of the piston, so that the valve, in the non-energized condition, independently or automatically assumes the first switching condition.

Preferably, the application of force onto the second end of the piston takes place with the aid of a solenoid, or with the aid of a hydraulic or pneumatic pressure. In other words, this is preferably either a valve that is actuated directly with the aid of a solenoid, or a pilot-controlled valve.

The four switching conditions of the valve are characterized in the following as the first switching condition, the second switching condition, the third switching condition, and the fourth switching condition; similarly, the four ports of the valve are the first port, the second port, the third port, and the fourth port. Preferably, the second to fourth switching conditions of the valve result in the following way. In the second switching condition, the first port is connected together with the third port, and the second port is connected together with the fourth port. In the third switching condition, the first, second, and fourth ports are connected to one another, while the third port is disconnected from the other ports. In the fourth switching condition, the first port is connected to the fourth port, and the second port is connected to the third port.

Preferably, the second through fourth switching conditions are achievable, via the application of force onto the first piston end, in the following sequence: second switching condition, third switching condition, fourth switching condition.

According a first possible example embodiment, the housing includes a valve pocket. The valve pocket is associated with the end of the housing that faces the second end of the piston. The valve pocket is continuously connected to a fifth port of the valve. "Continuously connected" is understood to be a fluidic connection that always exists and, in fact, regardless of the position of the piston. Via the fifth port, the valve is connectable, preferably continuously, to the fourth port via a valve-external line. As a result, the mechanical configuration of the valve can be simplified.

According to one alternative example embodiment, the housing includes a valve pocket, which is continuously connected to the fourth port via a connection line formed within the piston or within the housing. The valve pocket is arranged at the end of the housing that faces the second end of the piston. The aforementioned valve-external line can therefore be omitted.

Due to the aforementioned valve pocket, the establishment of the fluidic connection between the first port and the fourth port in the third switching condition of the valve is simplified. This applies for both aforementioned example embodiments. The valve pocket is preferably connected to or disconnected from the first port depending on the position of the piston.

The valve can be an integral part of a hydraulic system, which is suitable for actuating an actuator of a motor vehicle transmission. With the aid of the actuator, for example, a shift rail of the motor vehicle transmission can be actuated in order to control a gear shift of the motor vehicle transmission by way of an open-loop system.

Preferably, the four ports of the valve are associated with the hydraulic system in the following way. The first port is connected to a first pressure chamber of the actuator; the second port is connected to a second pressure chamber of the actuator; the third port is connected to a pressure supply line of the hydraulic system; the fourth port is connected to a tank or reservoir of the hydraulic system. As a result, due to the four switching conditions of the valve, the following operating conditions of the hydraulic system result:

in the first switching condition, the two pressure chambers of the actuator are disconnected from each other, and none of the pressure chambers are connected to the pressure supply line or to the tank, so that the actuator is hydraulically blocked;

in the second switching condition, the first pressure chamber is connected to the pressure supply line and the second pressure chamber is connected to the tank, so that the actuator is actuatable into a first direction;

in the third switching condition, the two pressure chambers are connected to the tank and the pressure supply line is disconnected from the two pressure chambers, so that the actuator is unpowered or can be moved with no force; and in the fourth switching condition, the first pressure chamber is connected to the tank and the second pressure chamber is connected to the pressure supply line, so that the actuator is actuatable into a second direction, which is opposite the first direction.

Such an assignment provides, on the one hand, for an energy-efficient hydraulic system and, on the other hand, an advantageous actuation of the actuator in the motor vehicle transmission, since, due to the hydraulic blocking of the actuator in the first operating condition of the valve, a mechanical detent of the actuator can be omitted. This simplifies the mechanical configuration of the motor vehicle transmission and also facilitates the hydraulic open-loop control, since a hydraulic overcompression of the mechanical detent does not apply. In addition, in the case of a changeover of the actuation of the actuator from the first direction into the second direction, and vice versa, a force-free condition of the actuator can be achieved, so that no pressure peaks arise, or are at least reduced, during this changeover.

Preferably, a switchable shut-off valve is provided in the connection between the pressure supply line of the hydraulic system and the third port of the valve. If the shut-off valve is in a shut-off position, the pressure supply line is disconnected from the third port. If the shut-off valve is in a connection position, the pressure supply line is connected to the third port. As a result, starting from the fourth switching condition, it is possible to switch into the first switching condition of the valve without an actuation of the actuator into the first direction taking place during the passage through the second switching condition.

In an example embodiment of the valve including a fifth port, the fifth port is preferably continuously connected to the fourth port of the valve via the tank or via a line connected to the tank. This reduces the mechanical manufacturing complexity of the valve.

The valve or the hydraulic system including the valve can be an integral part of a motor vehicle transmission. In this case, a motor vehicle transmission refers, in particular, to a multi-stage or continuously variable transmission, with the aid of which a multitude of ratios between an input shaft and an output shaft of the transmission is implementable. Such transmissions are utilized primarily in motor vehicles in order to adapt the rotational speed characteristic and the torque output characteristic of a drive unit to the driving resistances of the vehicle in a suitable way.

The motor vehicle transmission can include a preferably form-lockingly operating shift element, which is disengageable and engageable via an actuator system actuated with the aid of the hydraulic system. Preferably, in the second switching position of the valve, the shift element is moved into a first direction, and, in the fourth switching position, is moved into a second direction, which is opposite the first direction. In the first switching position, the shift element can be interlocked. In the third switching position, the shift element is movable independently of the hydraulic actuation.

BRIEF DESCRIPTION OF THE DRAWINGS

Exemplary embodiments of the invention are described in detail in the following with reference to the attached figures. Wherein.

DETAILED DESCRIPTION

Figure 1:
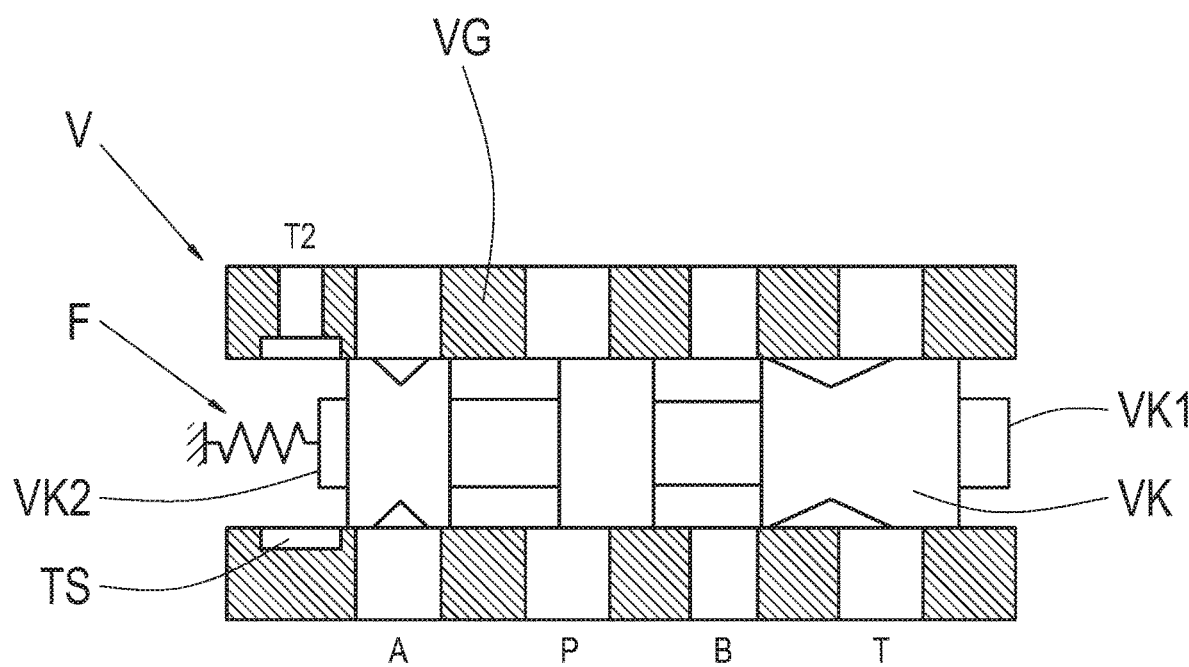
FIG. 1 through FIG. 3 each show a valve according to a first through third exemplary embodiment of the invention, respectively.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a valve V according to a first exemplary embodiment of the invention. The valve V includes a housing VG and a piston VK guided therein. A first end VK1 of the piston VK can be acted upon by a force, for example, via application of a hydraulic or pneumatic pressure. Alternatively, a solenoid can act at the first end VK1, with the aid of which the piston VK is displaceable. The force acting upon the first end VK1 counteracts the force of a spring F, which acts upon a second end VK2 of the piston VK. The valve V represented in FIG. 1 is designed as a slide valve. This is to be considered merely as an example. Alternatively, a design as a seat valve would be possible.

The valve V includes five ports, which are designated as first port A, second port B, third port P, fourth port T, and fifth port T2. The piston VK is shaped in such a way that the ports A, B, P, T are selectively connected to or disconnected from one another depending on the position of the piston VK in the housing VG. The fifth port T2 is continuously connected to the fourth port T via a valve-external connection (not represented in FIG. 1), so that the same pressure is present at the fourth port T and the fifth port T2. The fifth port T2 is connected to a pressure pocket TS, which is formed within the housing VG.

Figure 1B:
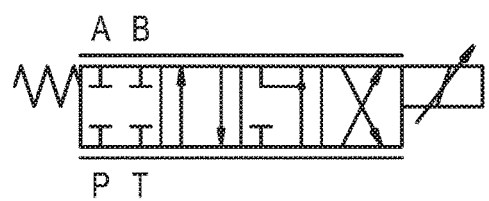

In the position of the piston VK represented in FIG. 1, the valve V assumes a first of four switching conditions. In this first switching condition, none of the ports A, B, P, T are connected to one another. This case occurs when no force or an insufficient force acts upon the first end VK1 in order to displace the piston VK counter to the force of the spring F in the direction of the second end VK2. The valve V is therefore in the first switching condition when no external force acts upon the first end VK1. FIG. 1b shows a block diagram of the valve V in the first switching position, by way of example including a solenoid for the selective application of a force onto the first end VK1.

Figure 2:
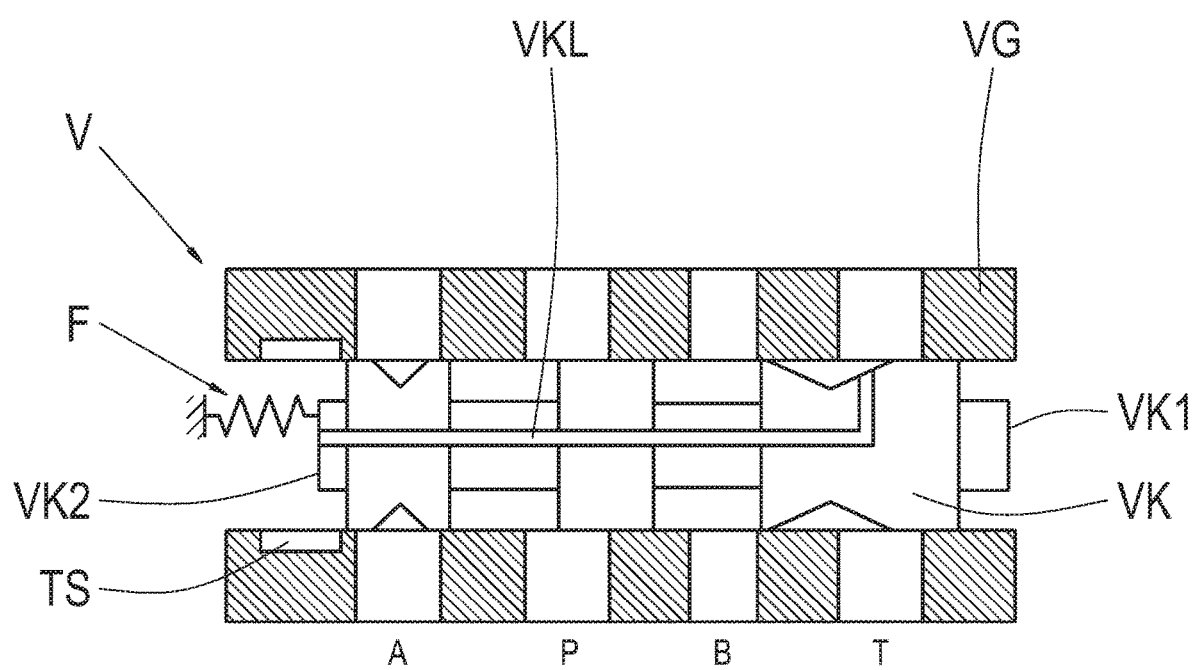

FIG. 2 shows a valve V according to a second exemplary embodiment of the invention, which essentially corresponds to the first exemplary embodiment represented in FIG. 1. Instead of the fifth port T2, the valve V in this case includes a connection line VKL formed within the piston VK, via which the pressure pocket TS is continuously connected to the fourth port T.

Figure 3:
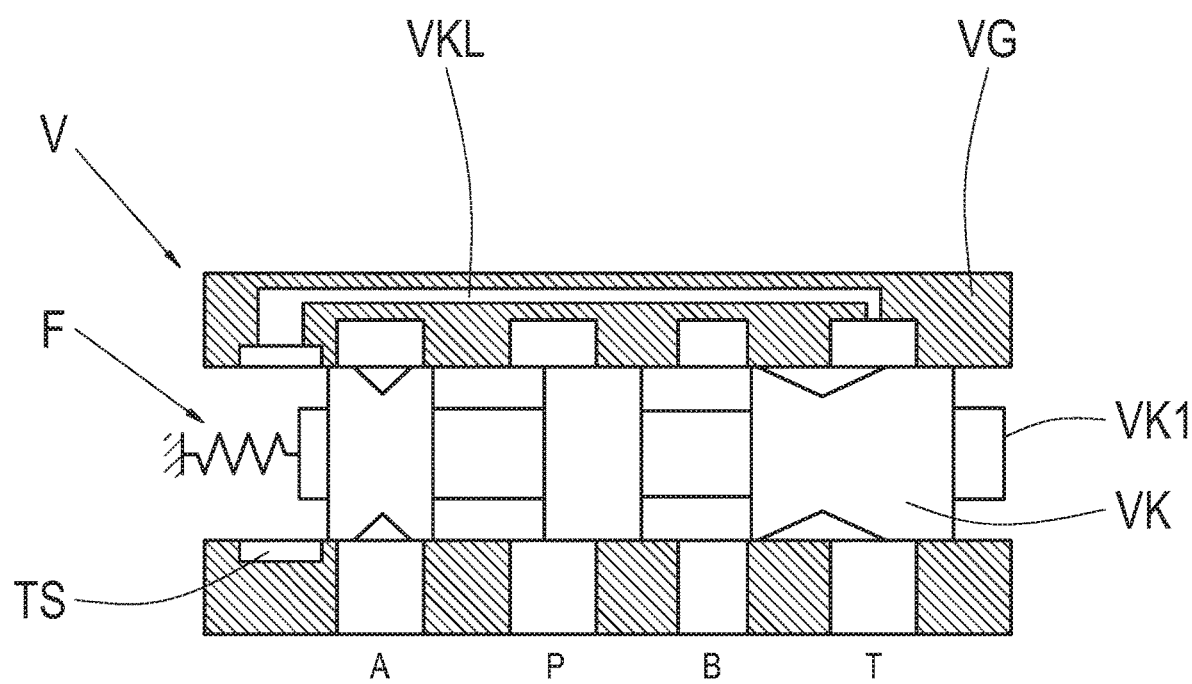

FIG. 3 shows a valve V according to a third exemplary embodiment of the invention, which essentially corresponds to the first exemplary embodiment represented in FIG. 1. Instead of the fifth port T2, the valve V in this case includes a connection line VKL formed within the housing VG, via which the pressure pocket TS is continuously connected to the fourth port T.

Figure 4:
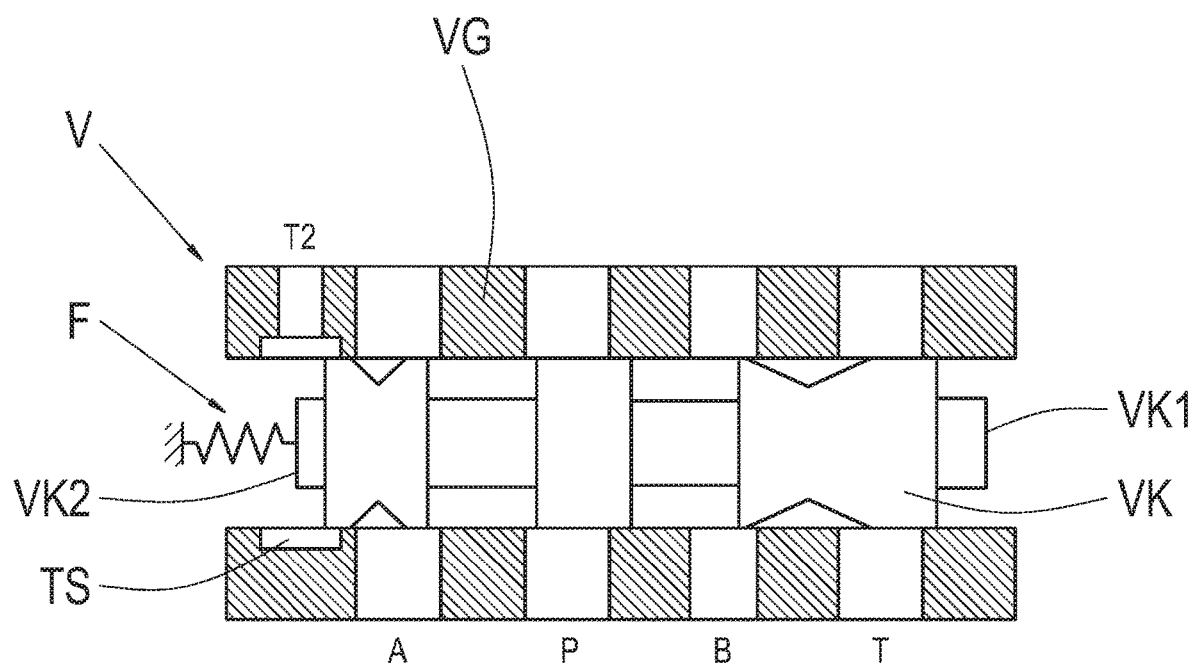
FIG. 4 through FIG. 6 show further switching conditions of the valve according to the first exemplary embodiment.
Figure 4B:
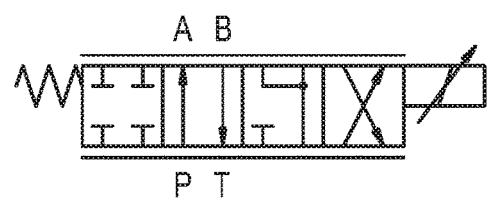

FIG. 4 shows the valve V according to the first exemplary embodiment in a second of the four switching conditions. This switching condition occurs when a sufficiently great force acts upon the first end VK1 in order to displace the piston VK counter to the force of the spring F by a defined reciprocating motion in the direction of the second end VK2. In this second switching condition, the first port A is connected to the third port P, and the second port B is connected to the fourth port T. FIG. 4b shows a block diagram of the valve V in the second switching position, by way of example including a solenoid for the selective application of a force onto the first end VK1.

Figure 5:
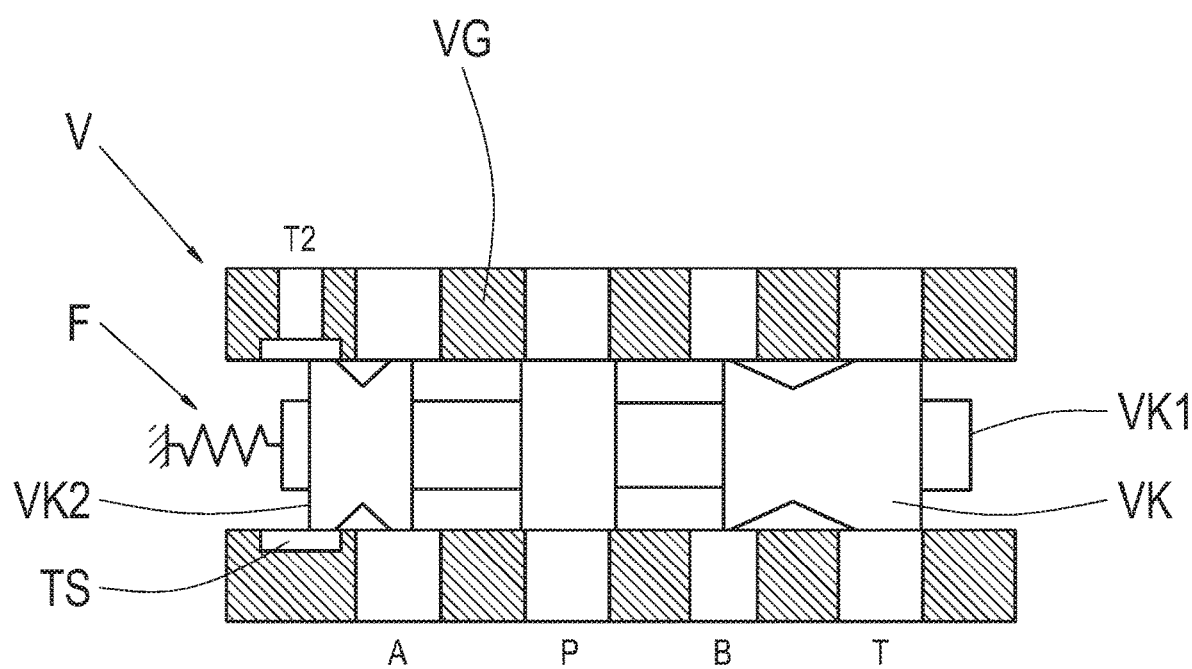
Figure 5B:
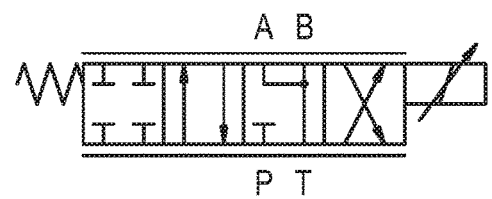

FIG. 5 shows the valve V according to the first exemplary embodiment in a third of the four switching conditions. This switching condition occurs when a sufficiently great force acts upon the first end VK1 in order to displace the piston VK counter to the force of the spring F by a defined reciprocating motion in the direction of the second end VK2. In this third switching condition, the first port A is connected to the second port B and to the fourth port T. The connection of the first port A to the fourth port T takes place via the fifth port T2 and the valve-external connection (not represented) between the fifth port T2 and the fourth port T. Upon utilization of the valve V according to the second or third exemplary embodiment, the connection takes place via the connection line VKL. The third port P is disconnected from the ports A, B, T. FIG. 5b shows a block diagram of the valve V in the third switching position, by way of example including a solenoid for the selective application of a force onto the first end VK1.

Figure 6:
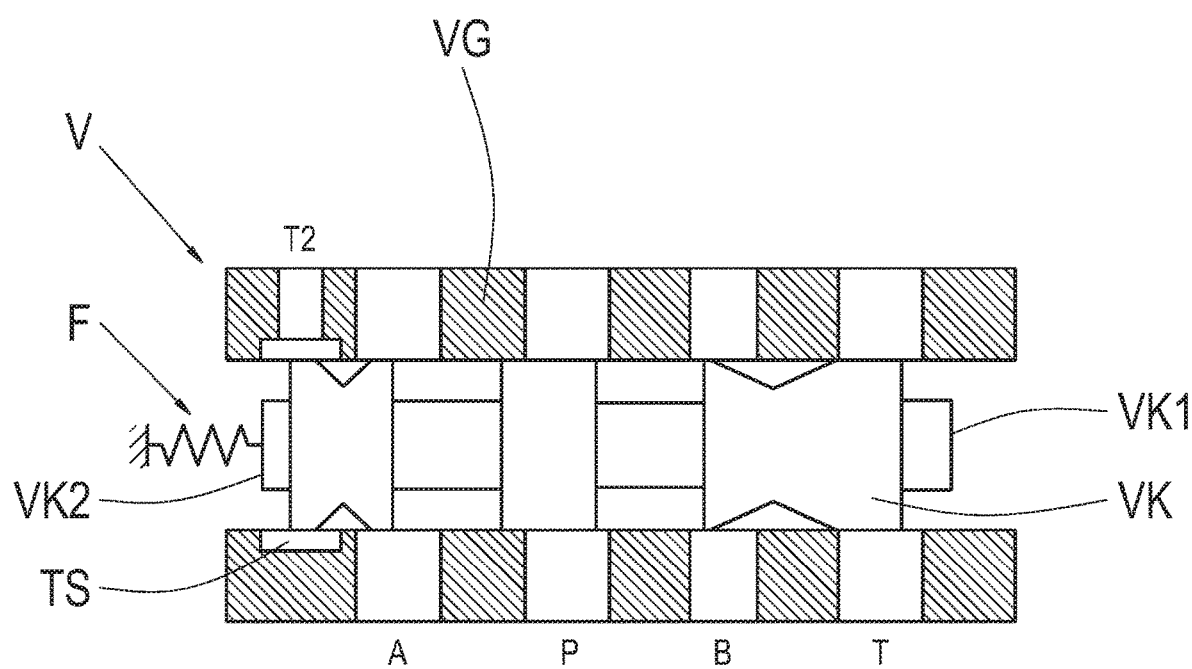
Figure 6B:
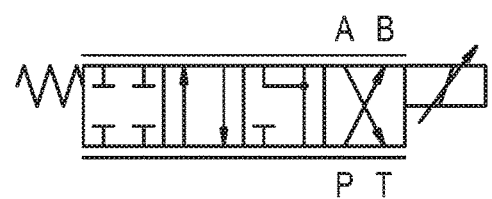

FIG. 6 shows the valve V according to the first exemplary embodiment in a fourth of the four switching conditions. This switching condition occurs when a sufficiently great force acts upon the first end VK1 in order to displace the piston VK counter to the force of the spring F by a defined reciprocating motion in the direction of the second end VK2. In this fourth switching condition, the first port A is connected to the fourth port T, and the second port B is connected to the third port P. The connection of the first port A to the fourth port T takes place via the fifth port T2 and the valve-external connection (not represented) between the fifth port T2 and the fourth port T. Upon utilization of the valve V according to the second or third exemplary embodiment, the connection takes place via the connection line VKL. FIG. 6b shows a block diagram of the valve V in the fourth switching position, by way of example including a solenoid for the selective application of a force onto the first end VK1.

Figure 7:
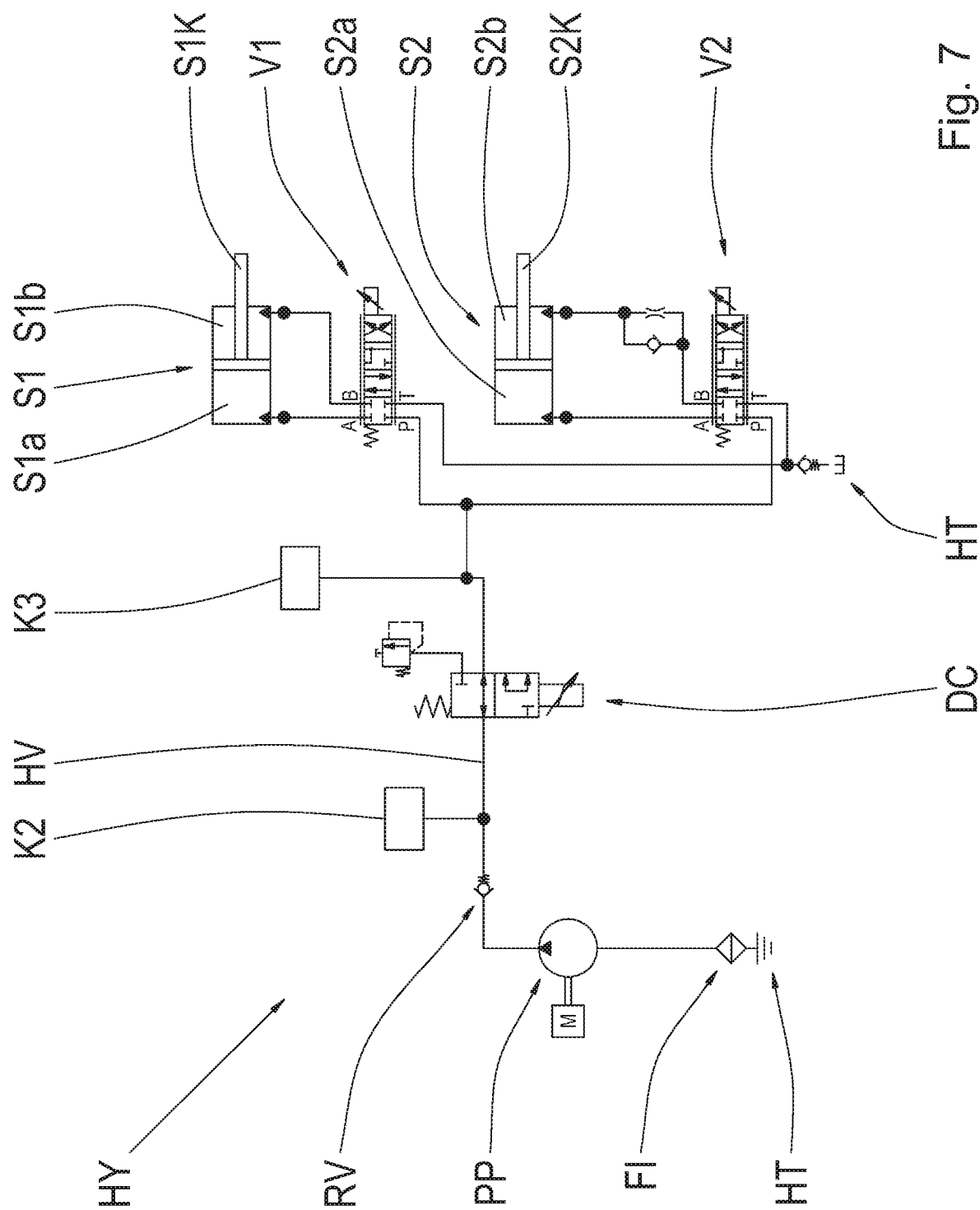
FIG. 7 shows a hydraulic system comprising the valve according to example aspects of the invention.

FIG. 7 shows a hydraulic system HY including a pump PP, which suctions hydraulic fluid out of a reservoir or tank HT through a filter FI and delivers the hydraulic fluid to a pressure supply line HV. A spring-loaded retention valve RV is provided in order to prevent a return flow of hydraulic fluid from the pressure supply line HV in the direction of the pump PP. The pressure supply line HV supplies various hydraulic consumers with hydraulic fluid, for example, a consumer K2, a consumer K3, and two actuators S1 and S2. A spring-loaded, electromagnetically actuatable shut-off valve DC is arranged in the connection between the pressure supply line HV, on the one hand, and the consumer K3 and the actuators S1 and S2, on the other hand. Alternatively to the electromagnetic actuation, the shut-off valve may be actuated in a pilot-controlled manner. The two actuators S1, S2 are controlled by an open-loop system via a valve V1, V2, respectively. The configuration and mode of operation of the valves V1, V2 correspond to the valve V described in the preceding figures. Each of the three exemplary embodiments according to FIG. 1 through FIG. 3 of the valve V can be utilized as a valve V1, V2 in the hydraulic system; therefore, reference is made to the description and the reference characters of the valve V with respect to the following.

In the shut-off position of the shut-off valve DC, the consumer K3 as well as the third port P of the valves V1, V2 are connected to a safety valve, which establishes a connection to the tank HT if a limiting pressure is exceeded.

Each of the two actuators S1, S2 includes two pressure chambers S1a, S1b, S2a, S2b, respectively, which are separated from each other by a piston S1K, S2K respectively. The first port A of the valve V1 is connected to the pressure chamber S1a. The second port B of the valve V1 is connected to the pressure chamber S1b. The third port P of the valve V1 is connected to the pressure supply line HV via the shut-off valve DC. The fourth port T of the valve V1 is connected to the tank HT via a check valve. In the same way, the first port A of the valve V2 is connected to the pressure chamber S2a, the second port B of the valve V2 is connected to the pressure chamber S2b, and the third port P of the valve V2 is connected to the pressure supply line HV via the shut-off valve DC. The fourth port T of the valve V2 is connected to the fourth port T of the valve V1 via a check valve and a restrictor.

If the valve V1 is in the first switching condition, as represented in FIG. 7, the two pressure chambers S1a, S1b are hydraulically disconnected from each other and are connected neither via the third port P to the pressure supply line HV nor via the fourth port T to the tank HT. In the non-actuated condition of the valve V1, the piston S1K is therefore hydraulically fixed. In the second switching condition of the valve V1, the first pressure chamber S1a is connected to the pressure supply line HV, provided the shut-off valve DC assumes the open position. The pressure chamber S1b is connected to the tank HT. In the second switching condition of the valve V and provided there is appropriate pressure in the pressure supply line HV, the piston S1K is displaced to the right. In the third switching condition of the valve V1, the two pressure chambers S1a, S1b are connected to the tank HT, with the pressure supply line HV blocked off. In the third switching condition, the piston S1K can be displaced independently of the hydraulic system HY. In the fourth switching condition of the valve V1, the pressure chamber S1b is connected to the pressure supply line HV, provided the shut-off valve DC assumes the open position, and the pressure chamber S1a is connected to the tank HT. In the fourth switching condition of the valve V and provided there is appropriate pressure in the pressure supply line HV, the piston S1K is displaced to the left. The aforementioned description of the function of the four switching conditions of the first valve V1 relates similarly to the valve V2, the two pressure compartments S2a, S2b, and the piston S2K.

Figure 8:
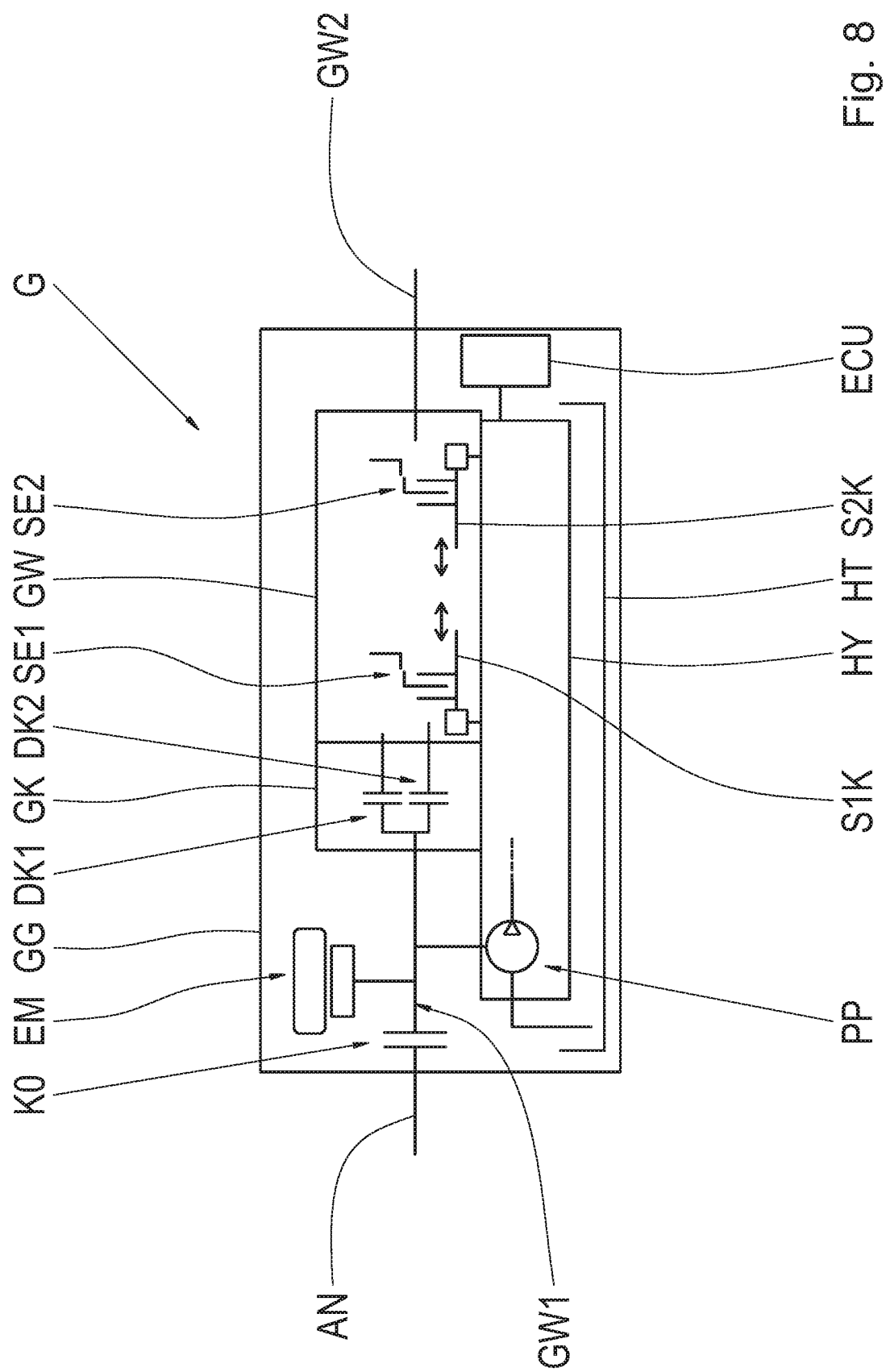
FIG. 8 shows a diagrammatic view of a motor vehicle transmission including the hydraulic system.

FIG. 8 shows a schematic of a motor vehicle transmission G including the hydraulic system HY. The motor vehicle transmission G includes a connecting shaft AN, which is connectable to an input shaft GW1 via a separating clutch K0. A rotor of an electric machine EM is connected to the input shaft GW1. The input shaft drives the pump PP, which is utilized for the pressure supply of the hydraulic system HY.

The motor vehicle transmission G includes a clutch section GK, which accommodates a first clutch DK1 and a second clutch DK2. By engaging the first clutch K1, the input shaft GW1 is connectable to a first sub-transmission. By engaging the second clutch K2, the input shaft GW1 is connectable to a second sub-transmission. In a gearshift section GW, different gear steps are implementable between the sub-transmissions and an output shaft GW2 with the aid of a gear set (not represented). The gear steps are engaged and disengaged, by way of example, with the aid of the two pistons S1K, S2K of the hydraulic system HY. Each of the pistons S1K, S2K controls, by way of an open-loop system, a shift element SE1, SE2, respectively.

An electronic control unit ECU controls the electromagnetically actuated valves of the hydraulic system HY by way of an open-loop system. The control unit ECU is connected to multiple sensors and other control units, and is configured for processing received signals and releasing control commands, depending on characteristic maps or models, to the valves and, if applicable, to further actuating elements of the hydraulic system HY.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

V, V1, V2 valve
VG housing
VK piston
VK1 first piston end
VK2 second piston end
F spring
A first port
B second port
P third port
T fourth port
T2 fifth port
TS valve pocket
VKL connection line
HY hydraulic system
PP pump
FI filter
HT tank
RV retention valve
HV pressure supply line
DC shut-off valve
K2, K3 consumer
S1 first actuator
S1a first compression chamber
S1b second pressure chamber
S1K piston
S2 second actuator
S2a first compression chamber
S2b second pressure chamber
S2K piston
G motor vehicle transmission
AN connection shaft
K0 separating clutch
GG housing
EM electric machine
GW1 input shaft
GW2 output shaft
GK clutch section
DK1 first clutch
DK2 second clutch
GW gearshift section
SE1, SE2 shift element
ECU electronic control unit

The invention claimed is:

1. A motor vehicle transmission (G), comprising:
a shift element (SE1, SE2) selectively disengageable and engageable via an actuator (S1, S2);
a hydraulic system (HY) for actuating the actuator (S1, S2), the hydraulic system (HY) comprising a valve (V, V1, V2) that comprises
a housing (VG), and
a piston (VK) displaceably guided in the housing (VG), a first end (VK1) of the piston (VK) configured to be acted upon by a force for displacing the piston (VK) against a spring (F), the spring (F) acting upon a second end (VK2) of the piston (VK), the valve (V, V1, V2) having four switching conditions, four ports (A, B, P, T) provided in the housing (VG) selectively connected to one another or blocked with respect to one another in the four switching conditions,
wherein none of the four ports (A, B, P, T) are connected to one another in a first switching condition of the four switching conditions, and
wherein the spring (F) is configured such that the piston (VK) is held in a position corresponding to the first switching condition when the force is not applied to the first end (VK1) of the piston (VK).

2. The motor vehicle transmission (G) of claim 1, wherein the force is applicable onto the first end (VK1) of the piston (VK) by a solenoid or by one of both of a hydraulic pressure or a pneumatic pressure.

3. The motor vehicle transmission (G) of claim 1, wherein:
in a second switching condition of the four switching conditions, a first port (A) of the four ports is connected to a third port (P) of the four ports, and a second port (B) of the four ports is connected to a fourth port (T) of the four ports;

in a third switching condition of the four switching conditions, the first port (A), the second port (B), and the fourth port (T) are connected to one another, and the third port (P) is disconnected from the first port (A), the second port (B), and the fourth port (T); and in a fourth switching condition of the four switching conditions, the first port (A) is connected to the fourth port (T), and the second port (B) is connected to the third port (P).

4. The motor vehicle transmission (G) of claim 1, wherein the actuator (S1, S2) is hydraulically locked with the valve (V, V1, V2) when the valve (V, V1, V2) is in the first switching condition.

5. The motor vehicle transmission (G) of claim 1, wherein the shift element (SE1, SE2) is movable by the actuator (S1, S2):
   in a first direction from a second switching condition of the four switching conditions;
   independently of the hydraulic system (HY) in a third switching condition of the four switching conditions; and
   in a second direction from a fourth switching condition of the four switching conditions.

6. A valve (V, V1, V2), comprising:
   a housing (VG); and
   a piston (VK) displaceably guided in the housing (VG), a first end (VK1) of the piston (VK) configured to be acted upon by a force for displacing the piston (VK) against a spring (F), the spring (F) acting upon a second end (VK2) of the piston (VK), the valve (V, V1, V2) having four switching conditions, four ports (A, B, P, T) provided in the housing (VG) selectively connected to one another or blocked with respect to one another in the four switching conditions,
   wherein none of the four ports (A, B, P, T) are connected to one another in a first switching condition of the four switching conditions,
   wherein the spring (F) is configured such that the piston (VK) is held in a position corresponding to the first switching condition when the force is not applied to the first end (VK1) of the piston (VK),
   wherein, in a second switching condition of the four switching conditions, a first port (A) of the four ports is connected to a third port (P) of the four ports, and a second port (B) of the four ports is connected to a fourth port (T) of the four ports,
   wherein, in a third switching condition of the four switching conditions, the first port (A), the second port (B), and the fourth port (T) are connected to one another, and the third port (P) is disconnected from the first port (A), the second port (B), and the fourth port (T),
   wherein, in a fourth switching condition of the four switching conditions, the first port (A) is connected to the fourth port (T), and the second port (B) is connected to the third port (P), and
   wherein the second, third, and fourth switching conditions are adjustable, via application of the force onto the first end (VK1) of the piston (VK), in the following sequence: second switching condition; third switching condition; and fourth switching condition.

7. A valve (V, V1, V2), comprising:
   a housing (VG); and
   a piston (VK) displaceably guided in the housing (VG), a first end (VK1) of the piston (VK) configured to be acted upon by a force for displacing the piston (VK) against a spring (F), the spring (F) acting upon a second end (VK2) of the piston (VK), the valve (V, V1, V2) having four switching conditions, four ports (A, B, P, T) provided in the housing (VG) selectively connected to one another or blocked with respect to one another in the four switching conditions,
   wherein none of the four ports (A, B, P, T) are connected to one another in a first switching condition of the four switching conditions,
   wherein the spring (F) is configured such that the piston (VK) is held in a position corresponding to the first switching condition when the force is not applied to the first end (VK1) of the piston (VK),
   wherein, in a second switching condition of the four switching conditions, a first port (A) of the four ports is connected to a third port (P) of the four ports, and a second port (B) of the four ports is connected to a fourth port (T) of the four ports,
   wherein, in a third switching condition of the four switching conditions, the first port (A), the second port (B), and the fourth port (T) are connected to one another, and the third port (P) is disconnected from the first port (A), the second port (B), and the fourth port (T),
   wherein, in a fourth switching condition of the four switching conditions, the first port (A) is connected to the fourth port (T), and the second port (B) is connected to the third port (P), and
   wherein a valve pocket (TS) of the housing (VG) is arranged at an end of the housing (VG) facing the second end (VK2) of the piston (VK), and wherein the valve pocket (TS) is continuously connected to a fifth port (T2) of the valve (V, V1, V2).

8. The valve (V, V1, V2) of claim 7, wherein the valve pocket (TS) is connected to or disconnected from the first port (A) depending on the position of the piston (VK).

9. A valve (V, V1, V2), comprising:
   a housing (VG); and
   a piston (VK) displaceably guided in the housing (VG), a first end (VK1) of the piston (VK) configured to be acted upon by a force for displacing the piston (VK) against a spring (F), the spring (F) acting upon a second end (VK2) of the piston (VK), the valve (V, V1, V2) having four switching conditions, four ports (A, B, P, T) provided in the housing (VG) selectively connected to one another or blocked with respect to one another in the four switching conditions,
   wherein none of the four ports (A, B, P, T) are connected to one another in a first switching condition of the four switching conditions,
   wherein the spring (F) is configured such that the piston (VK) is held in a position corresponding to the first switching condition when the force is not applied to the first end (VK1) of the piston (VK),
   wherein, in a second switching condition of the four switching conditions, a first port (A) of the four ports is connected to a third port (P) of the four ports, and a second port (B) of the four ports is connected to a fourth port (T) of the four ports,
   wherein, in a third switching condition of the four switching conditions, the first port (A), the second port (B), and the fourth port (T) are connected to one another, and the third port (P) is disconnected from the first port (A), the second port (B), and the fourth port (T), wherein, in a fourth switching condition of the four switching conditions, the first port (A) is connected to the fourth port (T), and the second port (B) is connected to the third port (P), and wherein a valve pocket (TS) of the housing (VG) is continuously connected to the fourth port (T) via a connection line (VKL) formed within the piston (VK) or formed in the housing (VG), and wherein the valve pocket (TS) is arranged at an end of the housing (VG) facing the second end (VK2) of the piston (VK).

10. The valve (V, V1, V2) of claim 9, wherein the valve pocket (TS) is connected to or disconnected from the first port (A) depending on the position of the piston (VK).

11. A hydraulic system (HY) for actuating an actuator (S1, S2) of a motor vehicle transmission (G), comprising a valve (V, V1, V2) that comprises a housing (VG), and a piston (VK) displaceably guided in the housing (VG), a first end (VK1) of the piston (VK) configured to be acted upon by a force for displacing the piston (VK) against a spring (F), the spring (F) acting upon a second end (VK2) of the piston (VK), the valve (V, V1, V2) having four switching conditions, four ports (A, B, P, T) provided in the housing (VG) selectively connected to one another or blocked with respect to one another in the four switching conditions, wherein none of the four ports (A, B, P, T) are connected to one another in a first switching condition of the four switching conditions, wherein the spring (F) is configured such that the piston (VK) is held in a position corresponding to the first switching condition when the force is not applied to the first end (VK1) of the piston (VK), wherein a first port (A) of the four ports (A, B, P, T) is connected to a first pressure chamber (S1$a$, S2$a$) of the actuator (S1, S2), wherein a second port (B) of the four ports (A, B, P, T) is connected to a second pressure chamber (S1$b$, S2$b$) of the actuator (S1, S2), wherein a third port (P) of the four ports (A, B, P, T) is connected to a pressure supply line (HV) of the hydraulic system (HY), wherein a fourth port (T) of the four ports (A, B, P, T) is connected to a reservoir (HT) of the hydraulic system (HY), and wherein a valve pocket (TS) of the housing (VG) is arranged at an end of the housing (VG) facing the second end (VK2) of the piston (VK), wherein the valve pocket (TS) is continuously connected to a fifth port (T2) of the valve (V, V1, V2), and wherein the fifth port (T2) is continuously connected to the fourth port (T) via the reservoir (HT) or via a line connected to the reservoir (HT).

12. The hydraulic system (HY) of claim 11, further comprising a switchable shut-off valve (DC) arranged between the pressure supply line (HV) and the third port (P).

* * * * *